US012333356B2

(12) United States Patent
Cox

(10) Patent No.: US 12,333,356 B2
(45) Date of Patent: Jun. 17, 2025

(54) NETWORK API CREDENTIALS WITHIN A TRANSLATION SESSION

(71) Applicant: MICROSOFT TECHNOLOGY LICENSING, LLC, Redmond, WA (US)

(72) Inventor: Landon Cox, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 53 days.

(21) Appl. No.: 17/824,842

(22) Filed: May 25, 2022

(65) Prior Publication Data

US 2023/0385139 A1 Nov. 30, 2023

(51) Int. Cl.
| | |
|---|---|
| G06F 7/76 | (2006.01) |
| G06F 9/54 | (2006.01) |
| H04L 9/40 | (2022.01) |
| H04L 12/66 | (2006.01) |

(52) U.S. Cl.
CPC .............. G06F 9/547 (2013.01); H04L 12/66 (2013.01); H04L 63/083 (2013.01)

(58) Field of Classification Search
None
See application file for complete search history.

(56) References Cited

U.S. PATENT DOCUMENTS

| | | |
|---|---|---|
| 2017/0006021 A1 | 1/2017 | Karaatanassov et al. |
| 2018/0184228 A1* | 6/2018 | Xie ..................... H04L 67/567 |
| 2021/0226951 A1 | 7/2021 | Goldstein et al. |
| 2021/0329544 A1* | 10/2021 | Bertin ................. H04W 12/088 |
| 2021/0336788 A1* | 10/2021 | Ziegler ................... H04L 12/66 |
| 2022/0276917 A1* | 9/2022 | Carr, Jr. ..................... G06F 8/65 |

OTHER PUBLICATIONS

Ved P. Kafle et al. ("ID-Based Communication Framework for New Generation Networks" (Year: 2014).*
"International Search Report and Written Opinion Issued in PCT Application No. PCT/US23/014407", Mailed Date: May 26, 2023, 14 Pages.

\* cited by examiner

Primary Examiner — Kevin L Young
Assistant Examiner — Abdou K Seye
(74) Attorney, Agent, or Firm — Newport IP, LLC; Jacob P. Rohwer

(57) ABSTRACT

The system disclosed herein is composed of a network API gateway that is configured to assign credentials to a call to an operator network. The call is initiated based on a request received from an application. The credentials are used by an operator API to authenticate the call. The network API gateway creates and uses a connectivity representation as a basis for assigning the credentials to the call. The credentials are generated by the application making the request and the credentials are passed to the network API gateway as part of a translation session (e.g., five minute time interval) during which the network API gateway translates requests for the application. Consequently, each request sent by the application to the network API gateway during the translation session no longer needs its own credentials, and thus, the developer is released from the requirement of managing credentials for each request.

20 Claims, 11 Drawing Sheets

NETWORK API CREDENTIALS WITHIN A TRANSLATION SESSION

BACKGROUND

Service providers often deploy applications in a datacenter that includes resources to supports various processing, networking, and storage functions. The datacenter may be configured as part of a cloud platform such as MICROSOFT AZURE, AMAZON WEB SERVICES, GOOGLE CLOUD, etc. Accordingly, datacenters are useable to provide computing services to businesses, organizations, and/or individual users at remote locations via network connections. Service providers often use edge sites to provide efficient delivery of data (e.g., streamed content). An edge site can include a geographically distributed group of "edge" servers and/or other devices that work together to reduce the latency associated with the delivery of data. That is, the user experience is improved by executing at least some functionality of an application at an edge server that is physically located closer to an endpoint device (e.g., "user equipment" or "UE") compared to a datacenter server. Consequently, the latency associated with the delivery of data to the endpoint device is reduced.

Multi-access edge computing (MEC) is a type of edge computing that uses cellular networks (e.g., 5G networks, LTE networks) and/or other types of networks (e.g., satellite networks) to extend cloud computing services to local edge deployments that are closer to the endpoint devices. Unfortunately, different operators control, manage, and/or configure these networks to which the cloud computing services are extended. In the United States alone, example operators include VERIZON, AT&T, and T-MOBILE. Thus, an operator of a network of datacenters that compose a cloud platform (e.g., MICROSOFT AZURE, AMAZON WEB SERVICES, GOOGLE CLOUD) is often different compared to an operator of a network to which the cloud computing services is extended (e.g., VERIZON, AT&T, T-MOBILE).

To enable interactions with a datacenter, the networks to which cloud computing services are extended include application programming interfaces (APIs). The APIs are typically configured to use different protocols to enable interactions between the networks and the datacenter. Consequently, as an application that is managed and executed in a datacenter scales, developers of the application must learn different protocols (e.g., write different code) so that the application can interact with multiple different APIs respectively configured within multiple different networks to which the cloud computing services are extended. This is a cumbersome task as the number of networks with edge sites grows and/or as the application is deployed to different parts of the world. For instance, different geographic regions use different operator networks (e.g., Europe includes different operator networks compared to the ones configured in the United States).

It is with respect to these considerations and others that the disclosure made herein is presented.

SUMMARY

The system described herein implements a network application programming interface (API) gateway that is configured to translate requests made by an application executing in a datacenter into a call that can be made in accordance with a configuration of an API (referred to herein as an "operator API") within a network to which cloud computing services is extended (referred to herein as an "operator network"). The application may be a cloud application that is hosted within a cloud platform composed of one or more datacenters. The translation enables a developer of the application to write requests in a common format knowing that the requests can be translated to any one of multiple different protocols used by multiple different operator APIs respectively configured within multiple different operator networks. For instance, the developer of the application can write a request in an abstracted language format that defines high-level objectives (e.g., "api.getProperties"), and the request can be translated into lower-level code that is compatible, or complies, with a particular protocol used by an operator API configured within a target operator network to which the request is directed.

The network API gateway is further configured to assign credentials to a call to the target operator network. The call is initiated based on the request received from the application. The credentials are used by an operator API to authenticate the call. Previously, the developer of the application would need to manage separate credentials for each request. That is, the type of credentials and the process of verifying the credentials to authenticate the call can vary from one operator API to the next. Accordingly, the developer of the application would be required to spend a considerable amount of time and resources ensuring that appropriate credentials are configured to accompany each request that is sent to the network API gateway.

As described herein, the network API gateway creates and uses a connectivity representation as a basis for assigning the credentials to the call. The credentials are generated by the application making the request and the credentials are passed to the network API gateway as part of a translation session (e.g., five minute time interval, ten minute time interval, etc.) during which the network API gateway translates requests for the application. Consequently, each request sent by the application to the network API gateway during the translation session no longer needs its own credentials, and thus, the developer is released from the requirement of managing credentials for each request.

To create the connectivity representation, the network API gateway is configured to determine identifiers for devices that are connected to each of multiple operator networks (e.g., the VERIZON network, the AT&T network, the T-MOBILE network). The devices can include endpoint devices (e.g., "user equipment" or "UE") and network devices (e.g., a MEC server). An identifier can be a phone number, an Internet Protocol (IP) address, and/or an assigned name which can be indicative of a location. Other suitable identifiers are also contemplated in the context of this disclosure.

In one example, the connectivity representation is a hierarchical namespace. The network API gateway is configured to map the identifiers for the devices into the hierarchical namespace. The hierarchical namespace includes a root object as well as objects for different operator networks. Accordingly, the hierarchical namespace defines various paths for devices such that the network API gateway has an organizational understanding of devices with which an application may want to interact. In one example, a path for a device in the hierarchical namespace includes the root object (e.g., "NET"), an object that identifies an operator network (e.g., "VERIZON", "ATT"), an object that identifies a category of a device (e.g., "UE" or "Edge"), and an object that includes the identifier for the device (e.g., "US-EAST-NY-3", "174.204.72.203").

In another example, the connectivity representation can include a table or other suitable structure that defines objects (e.g., attributes) for the devices. Accordingly, a table entry for a device identifier can include an object that identifies an operator network (e.g., "VERIZON", "ATT") and an object that identifies a category of a device (e.g., "UE" or "Edge").

Based on input from the application (e.g., the developer), the network API gateway is configured to associate the credentials with at least part of the hierarchical namespace and/or with one or multiple device identifiers. Again, the credentials are useable to authenticate calls that are provided from the network API gateway to an operator API, so that an application's requests can be fulfilled. In one example, an application provides a request to check in on a connection between an endpoint device and a multi-access edge computing (MEC) server.

The credentials can be associated with the root object (e.g., "NET") in the hierarchical namespace, or all the entries in the table. Accordingly, the application can use the same credentials to authenticate calls made to an operator API configured within each of multiple different operator networks included in the hierarchical namespace. In this example scenario, the credentials may be referred to as "universal" credentials because they are useable in association with multiple different operator networks.

Alternatively, the credentials can be associated with an object in the hierarchical namespace that identifies a specific operator network (e.g., "VERIZON" or "ATT"), or the entries in the table that have an object that defines the specific operator network. Accordingly, the application can use different credentials to authenticate calls made to operator APIs configured within each of multiple different operator networks, e.g., included in the hierarchical namespace—first credentials for the "VERIZON" network and second credentials for the "ATT" network. In this example scenario, the credentials may be referred to as "network-specific" credentials because they are useable in association with a single operator network.

Even further, the credentials can be associated with an object that identifies a specific device (e.g., the MEC server "US-EAST-NY-3"), as included in the hierarchical namespace or table. This may be desired when the specific device is a sensitive or restricted device such that it processes, stores, and/or transmits confidential data. For instance, the specific device may be under control of a government agency that performs security and/or intelligence analysis. Thus, the application may want to configure a separate set of credentials for a specific device such as a MEC server for an increased level of security and confidentiality. In this example scenario, the credentials may be referred to as "device-specific" credentials because they are useable in association with a single device.

When the network API gateway receives a request from the application, the network API gateway determines a target object in the connectivity representation (e.g., hierarchical namespace, table, etc.) that is a subject of the request. The network API gateway then matches the target object with a path in the hierarchical namespace or an entry in the table. The matched path or entry identifies the operator network, amongst multiple different operator networks, to which the call is to be sent. The matched path or entry also reveals the previously assigned credentials associated with the target object so that the credentials can be used in order to have the call authenticated by the operator API. Subsequently, the network API gateway initiates the call to the operator API (e.g., an API proxy server) of the identified operator network. The call includes the credentials useable for the operator API to authenticate the call.

The techniques disclosed herein provide a number of features that improve existing computing devices and processes associated with generating and assigning credentials to calls made to operator APIs. For instance, resources and time no longer have to be expended to closely manage credentials for each request sent by an application to the network API gateway. Rather, via the implementation of the translation session and the use of a connectivity representation (e.g., hierarchical namespace, a table) with assigned credentials, the operations run more smoothly (e.g., computing resources such as processor cycles, memory, network bandwidth are saved) and the experience with respect to making authenticated calls via a network API gateway is greatly improved. Other technical benefits not specifically mentioned herein can also be realized through implementations of the disclosed subject matter.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The system disclosed herein is composed of a network application programming interface (API) gateway that is configured to translate requests made by an application executing in a datacenter into a call that can be made in accordance with a configuration of an API within a network to which cloud computing services is extended. The translation enables a developer of the application to write requests in a common format knowing that the requests can be translated to any one of multiple different protocols used by multiple different operator APIs respectively configured within multiple different operator networks.

The network API gateway is further configured to assign credentials to a call to the target operator network. The call is initiated based on the request received from the application. The credentials are used by an operator API to authenticate the call. Previously, the developer of the application would need to manage separate credentials for each request. That is, the type of credentials and the process of verifying the credentials to authenticate the call can vary from one operator API to the next. Accordingly, the developer of the application would be required to spend a considerable amount of time and resources ensuring that appropriate credentials are configured to accompany each request that is sent to the network API gateway.

As described herein, the network API gateway creates and uses a connectivity representation as a basis for assigning the credentials to the call. The credentials are generated by the application making the request and the credentials are passed to the network API gateway as part of a translation session (e.g., five minute time interval, ten minute time interval, etc.) during which the network API gateway translates requests for the application. Consequently, each request sent by the application to the network API gateway during the translation session no longer needs its own credentials, and thus, the developer is released from the requirement of managing credentials for each request.

The application may use requests (e.g. in the control plane) to gather information related to a status and/or changes in device, connection, and/or network properties (e.g., related to the data plane) so that experiences provided to endpoint devices are improved (e.g., latency is reduced).

Figure 1:
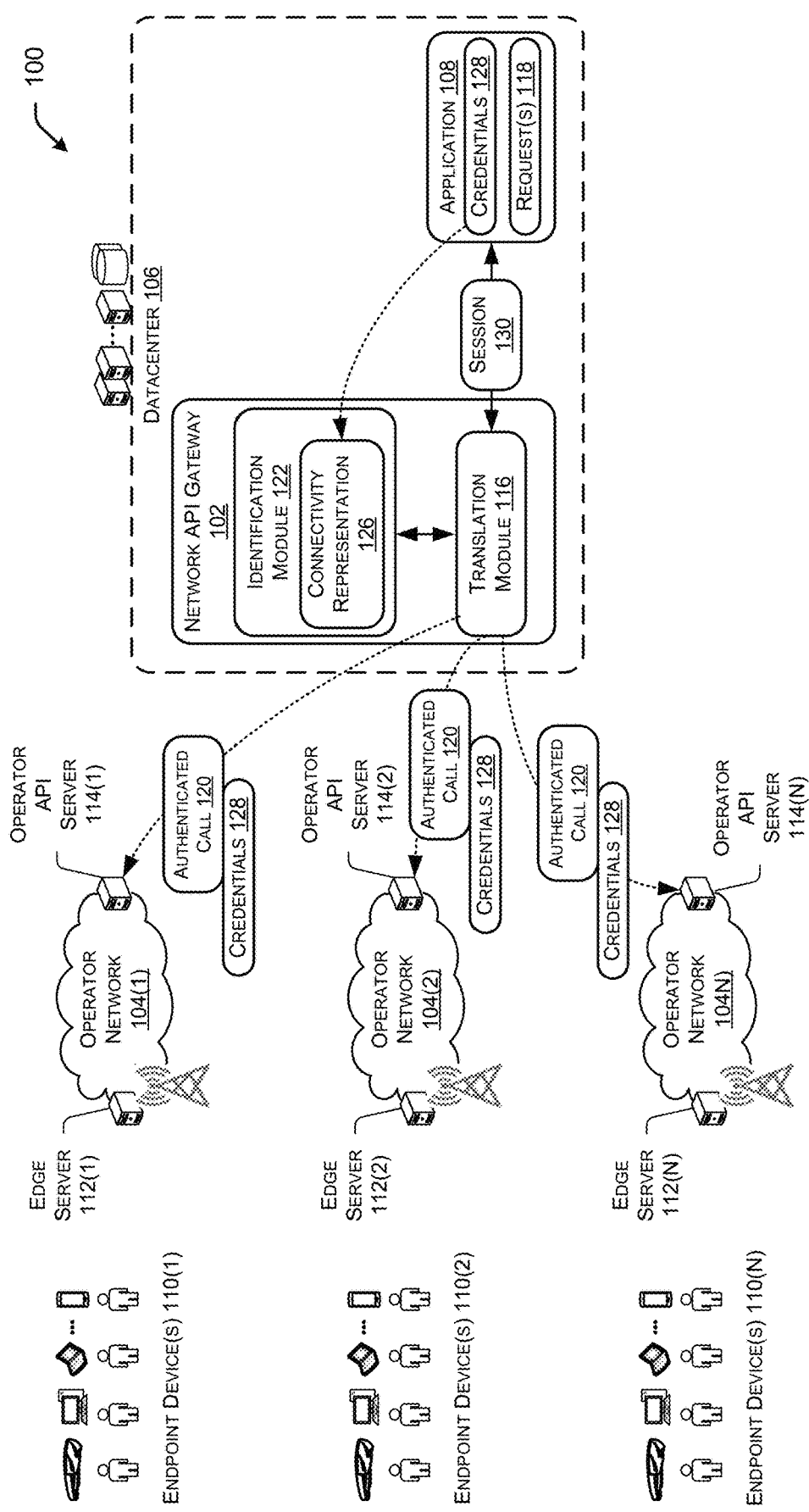
FIG. 1 illustrates an example environment in which a network API gateway can create a connectivity representation associated with multiple operator networks and assign credentials to at least part of the connectivity representation to ensure calls made to the operator networks on behalf of an application are authenticated and completed.

FIG. 1 illustrates an example environment 100 in which a network application programming interface (API) gateway 102 can create a connectivity representation associated with multiple operator networks 104(1-N) and assign credentials to at least part of the connectivity representation to ensure calls made to the operator networks 104(1-N) on behalf of an application are authenticated and completed (where N is a number such as 1, 2, 3, 5, 10, 20, etc.). As shown, the network API gateway 102 is configured within, or in association with, a datacenter 106. The datacenter 106 may be part of a cloud platform. Thus, the datacenter 106 may host an application 108 useable by various endpoint devices 110(1-N), where the endpoint devices 110(1-N) are configured to access functionality of the application 108 via respective edge servers 112(1-N) connected to the operator networks 104(1-N).

As described above, the datacenter 106 and/or the application 108 use edge sites to provide efficient delivery of data (e.g., streamed content). That is, the user experience is improved by executing at least some functionality of the application 108 at edge servers 112(1-N) that are physically located closer to the endpoint devices 110(1-N) (e.g., "user equipment" or "UE") compared to a datacenter server. Consequently, the latency associated with the delivery of data is reduced. An example edge server includes a multi-access edge computing (MEC) server.

To enable interactions with the datacenter 106, the operator networks 104(1-N) configure operator API servers 114 (1-N) (e.g., API proxy servers). The operator API servers 114(1-N) are typically configured to use different protocols to enable interactions between the operator networks 104 (1-N) and the datacenter 106. Consequently, as the application 108 scales, developers of the application 108 must learn different protocols (e.g., write different code) so that the application 108 can interact with multiple different operator API servers 114(1-N) respectively configured within multiple different operator networks 104(1-N). Again, this is a cumbersome task as the number of operator networks with edge sites grows and/or as the application 108 is deployed to different parts of the world (e.g., the number N increases).

To address this problem, the network API gateway 102 includes a translation module 116 which translates requests 118 made by the application 108 executing in the datacenter 106 into a call 120 that can be made in accordance with a protocol used by any one of the multiple operator API servers 114(1-N). The translation enables a developer of the application 108 to write requests 118 in a common format knowing that the requests 118 can be translated into a call 120 that can be made in accordance with any one of multiple different protocols used by the different operator API servers 114(1-N). For instance, the developer of the application 108 can write a request 118 in an abstracted language format that defines high-level objectives (e.g., "api.getProperties"), and the request 118 can be translated into lower-level code that is compatible, or complies, with a particular protocol used by any one of the operator API servers 114(1-N).

The network API gateway 102 further includes an identification module 122. The number of illustrated modules is just an example, and the number can vary higher or lower. That is, functionality described herein in association with the illustrated modules can be performed by a fewer number of modules or a larger number of modules on one device or spread across multiple devices.

The identification module 122 is configured to create a connectivity representation 126. To create the connectivity representation 126, the identification module 122 is configured to determine identifiers for devices that are connected to each of the multiple operator networks 104(1-N) (e.g., the VERIZON network, the AT&T network, the T-MOBILE network). The devices can include endpoint devices (e.g., "user equipment" or "UE") and network devices (e.g., a MEC server). An identifier can be a phone number, an Internet Protocol (IP) address, and/or an assigned name which can be indicative of a location. Other suitable identifiers are also contemplated in the context of this disclosure.

Figure 2:
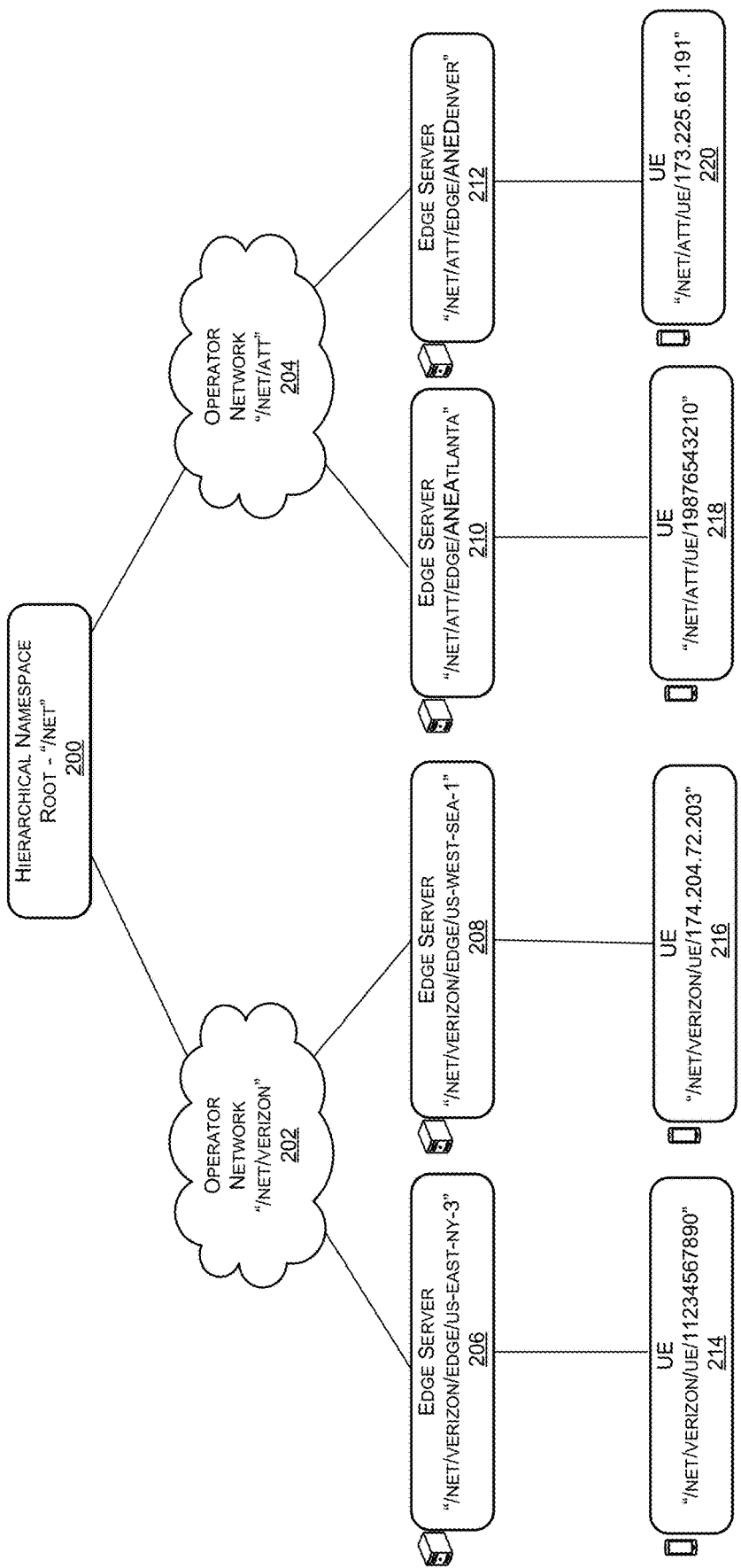
FIG. 2 illustrates an example hierarchical namespace that can be used to assign credentials to a call.

As described herein with respect to the examples of FIG. 2, the connectivity representation 126 can be a hierarchical namespace. The identification module 122 is configured to map the identifiers for the devices into the hierarchical namespace 126. Accordingly, the hierarchical namespace 126 defines various paths for devices such that the network API gateway 102 has an organizational understanding of devices with which an application 108 executing in the datacenter 106 may want to interact.

As shown in FIG. 2, an example hierarchical namespace includes a root object 200 (e.g., "/NET"). Under the root object 200 are objects 202, 204 and paths that identify operator networks (e.g., "/NET/VERIZON", "/NET/ATT"). Under the operator network objects 202, 204 are objects 206, 208, 210, 212 and paths that identify edge servers (e.g., "/NET/VERIZON/EDGE/US-EAST-NY-3", "/NET/VERIZON/EDGE/US-WEST-SEATTLE-1", "/NET/ATT/EDGE/ANEATLANTA", "/NET/ATT/EDGE/ANEDENVER"). Under the edge server objects 206, 208, 210, 212 are objects 214, 216, 218, 220 and paths that identify endpoint devices or UEs (e.g., "/NETNERIZON/UE/11234567890", "/NETNERIZON/UE/174.204.72.203", "/NET/ATT/UE/19876543210", "/NET/ATT/UE/173.225.61.191").

As discussed above and as illustrated in FIG. 2, a path for a device in the hierarchical namespace 126 includes the root object (e.g., "NET"), an object that identifies an operator network (e.g., "VERIZON", "ATT"), an object that identifies a category of a device (e.g., "UE" or "EDGE"), and/or an object that includes the identifier for the device (e.g., "US-EAST-NY-3", "174.204.72.203").

Moving back to FIG. 1, in an alternative example, the connectivity representation 126 can be a table or other suitable structure that defines objects (e.g., attributes) for the identified devices. Accordingly, a table entry for a device identifier can include an object that identifies an operator network, an object that identifies a category of a device, and/or other objects useable to understand connectivity attributes.

Based on input from the application 108 (e.g., the developer), the identification module 122 is configured to associate credentials 128 with at least part of the connectivity representation 126. Examples of this are described herein with respect to FIGS. 3A-3D. The credentials 128 are useable to authenticate the calls 120 that are provided from the network API gateway 102 to different operator API servers 114(1-N).

The credentials 128 are generated by the application 108 making the requests 118 and the credentials 128 are passed to the network API gateway 102 as part of (e.g., at the beginning of) a translation session 130 during which the network API gateway 102 translates the requests 118 for the application 108. Consequently, each request 118 sent by the application 108 to the network API gateway 102 during the translation session 130 no longer needs its own credentials, and thus, the developer is released from the requirement of managing credentials for each request. New credentials can be generated for a new session after the previous session ends (e.g., every five minutes, every ten minutes, etc.) and the previous credentials are no longer valid.

As described above, the credentials 128 are used by the operator API servers 114(1-N) to authenticate the call 120, and thus, the call 120 is illustrated as an authenticated call 120 with attached credentials 128. Accordingly, the operator API servers 114(1-N) are informed, by the network API gateway 102, of the credentials 128 being used for a particular translation session 130.

When the translation module 116 receives a request 118 from the application 108, the translation module 116 determines a target object in the connectivity representation 126 that is a subject of the request. The translation module 116 then matches the target object with a path or an entry in the connectivity representation 126. The matched path or entry identifies a specific operator network 104(1), amongst multiple different operator networks included in the connectivity representation 126, to which the call 120 is to be sent. The matched path or entry also reveals the previously assigned credentials 128 associated with the target object so that the credentials can be used in order to have the call authenticated by the operator API server 114(1). Subsequently, the translation module 116 initiates the authenticated call 120 to the operator API server 114(1) of the identified operator network 104(1). The call 120 includes the credentials 128 useable for the operator API server 114(1) to authenticate the call.

Figure 3A:
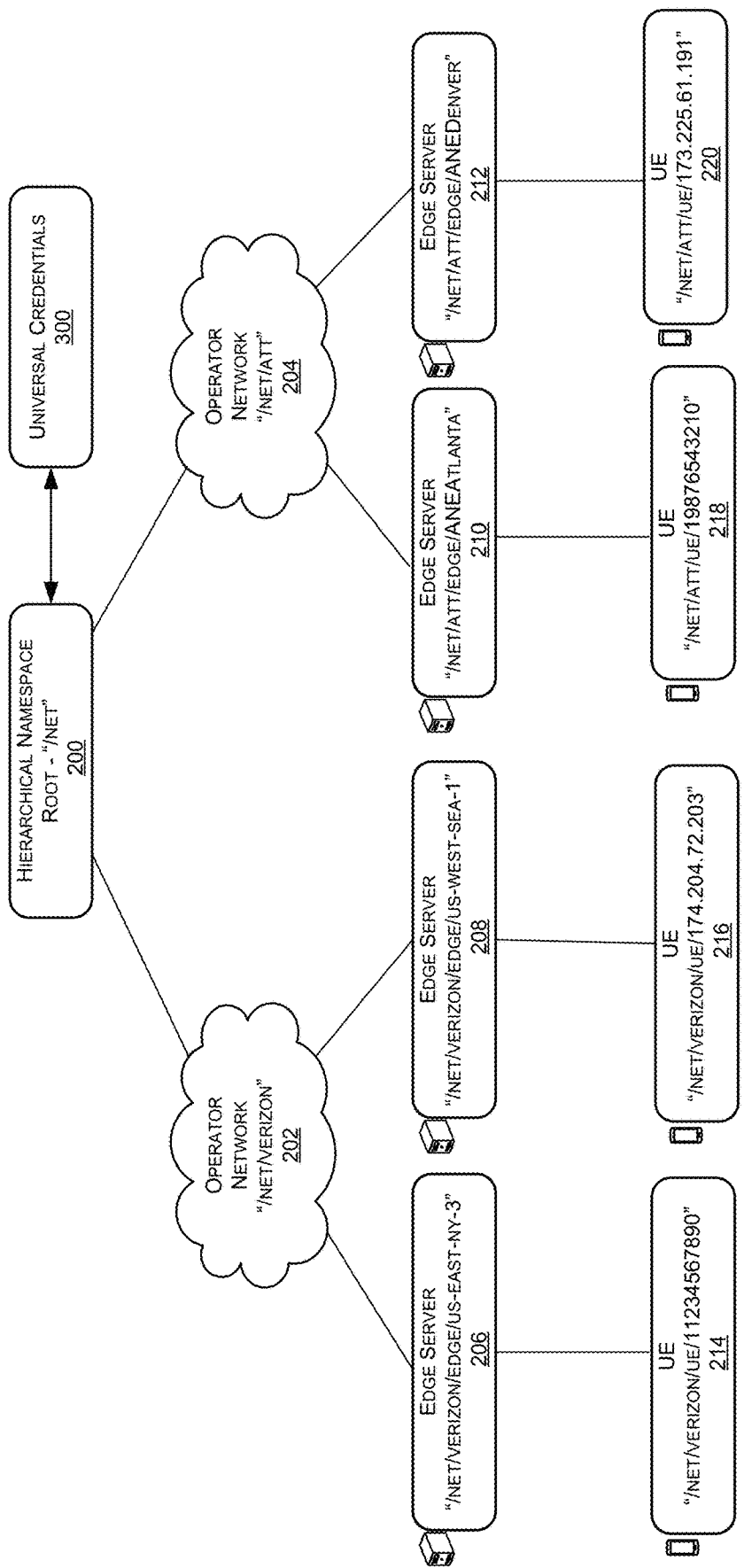
FIG. 3A illustrates how credentials can be universal credentials used for the entire hierarchical namespace.

FIG. 3A illustrates how credentials can be universal credentials 300 used for the entire hierarchical namespace illustrated in FIG. 2. As shown, the universal credentials, under instruction from the application 108, are assigned to the root object 200 (e.g., "/NET") of the hierarchical namespace 126. Accordingly, the application 108 can use the same credentials to authenticate calls made to an operator API server configured within each of multiple different operator networks 202, 204 included in the hierarchical namespace. For instance, a call made to the VERIZON operator network 202 during a translation session 130 uses the same credentials 300 as a different call made to the AT&T operator network 204 during the translation session 130.

Figure 3B:
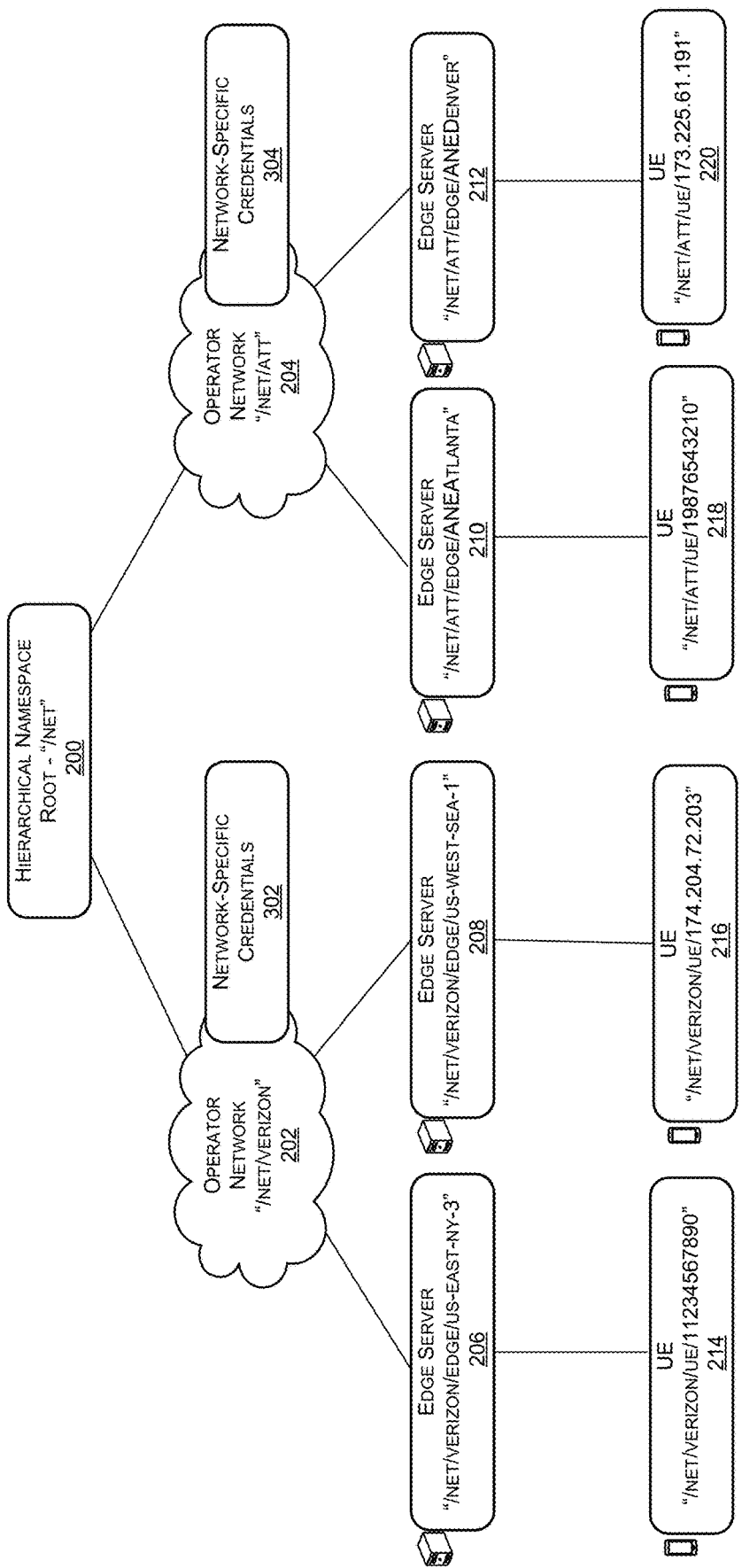
FIG. 3B illustrates how credentials can be network-specific credentials used for an individual operator network.

FIG. 3B illustrates how credentials can be network-specific credentials used for an individual operator network. In this example, separate network-specific credentials 302, 304 can be associated with objects that identify specific operator networks (e.g., "VERIZON" or "ATT"). Accordingly, the application 108 can use first network-specific credentials 302 to authenticate calls made to the VERIZON operator network 202 and second network-specific credentials 304 for calls made to the AT&T network 204.

Figure 3C:
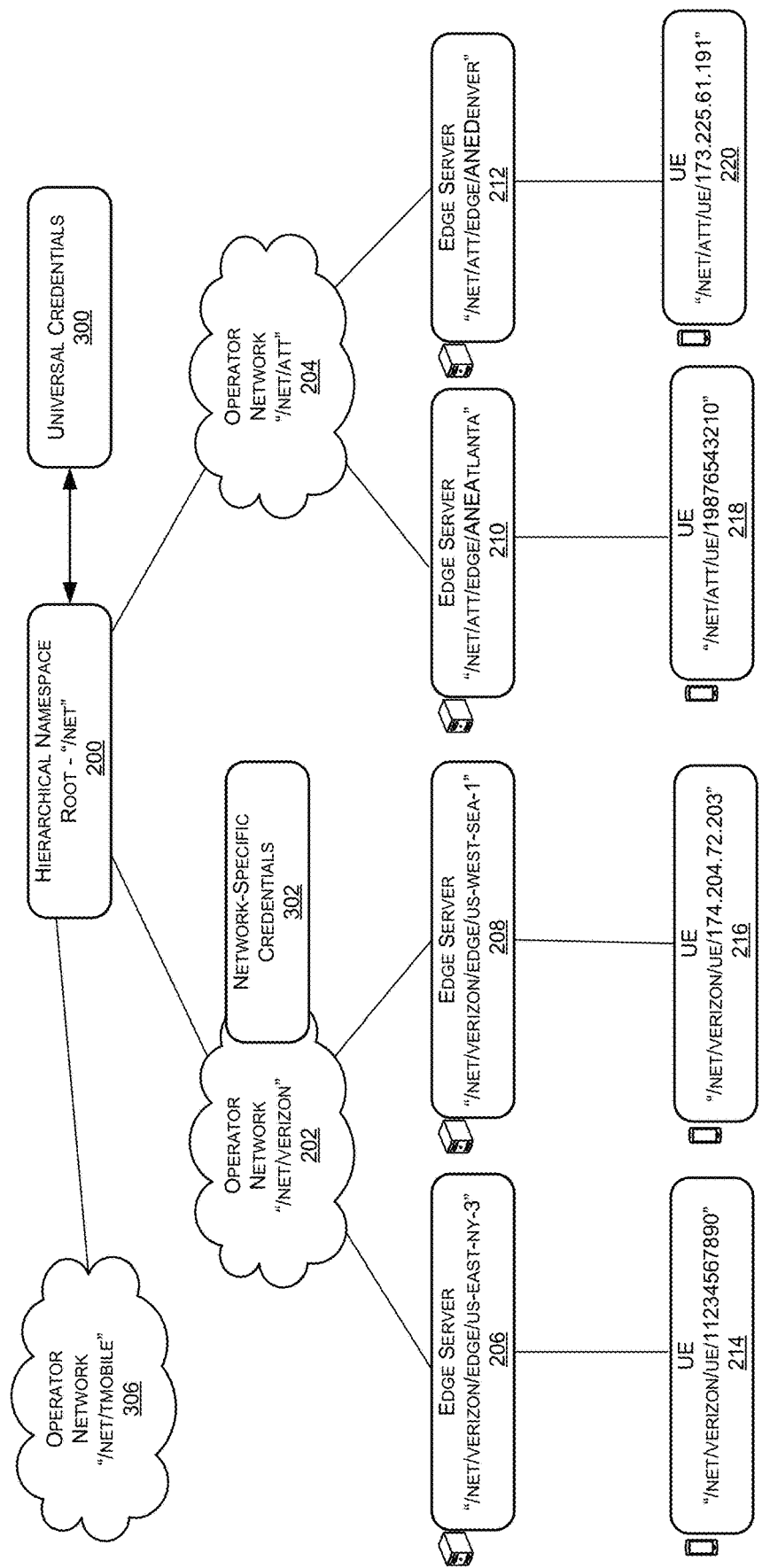
FIG. 3C illustrates how credentials are prioritized based on a level in the hierarchical namespace at which they are assigned.

FIG. 3C illustrates how credentials are prioritized based on a level in the hierarchical namespace at which they are assigned. FIG. 3C illustrates both the universal credentials 300 and a single instance of the network-specific credentials 302 assigned to the "VERIZON" operator network object 202. Thus, a call directed to any device in the AT&T operator network 204, or another operator network 306 (e.g., the T-MOBILE operator network) in the hierarchical namespace 126, is governed by the universal credentials 300. However, the network-specific credentials 302 have a higher priority compared to the universal credentials 300 due to the lower level in the hierarchical namespace 126 at which they are assigned. Thus, a call directed to any device in the VERIZON operator network 202 is governed by the network-specific credentials 302.

Figure 3D:
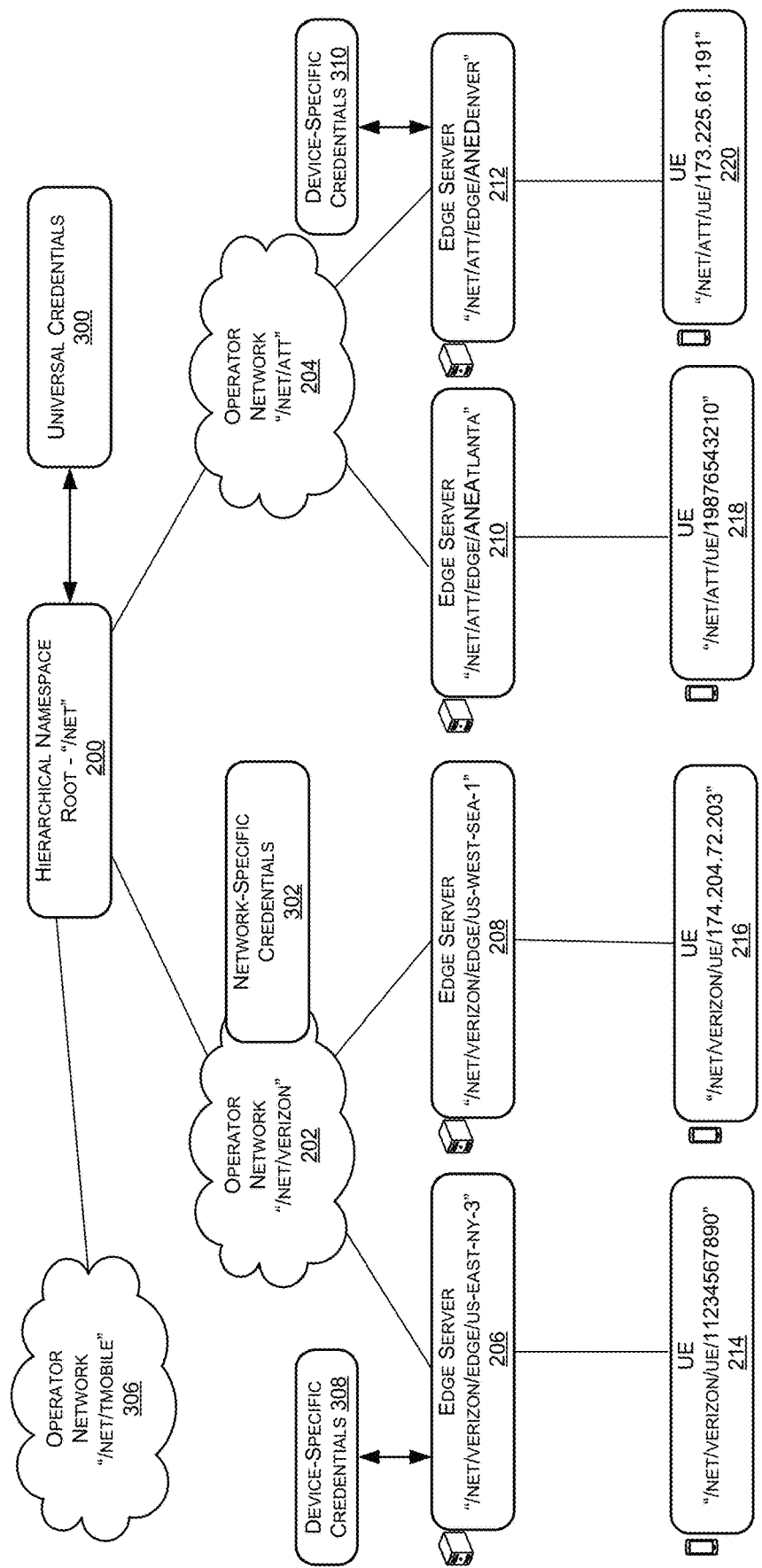
FIG. 3D illustrates how credentials can be device-specific credentials used for an individual device and how credentials are prioritized based on a level in the hierarchical namespace at which they are assigned.

FIG. 3D illustrates how credentials can be device-specific credentials used for an individual device and how the credentials are prioritized based on a level in the hierarchical namespace at which they are assigned. Device-specific credentials may be desired when the specific device is a sensitive or restricted device such that it processes, stores, and/or transmits confidential data. For instance, the specific device may be under control of a government agency that performs security and/or intelligence analysis. Thus, the application 108 may want to configure a separate set of credentials for a specific device, such as a MEC server, for an increased level of security and confidentiality.

As shown in FIG. 3D, device-specific credentials 308 are assigned to the edge server object "US-EAST-NY-3" 206 and separate device-specific credentials 310 are assigned to the edge server object 212 "ANEDENVER". Accordingly, different calls sent to the same operator API server may include different credentials depending on the device that is the subject of the call (e.g., the device to which the call is directed). In other words, the operator API server may be configured to authenticate calls using different credentials.

As shown in FIG. 3D, calls made to most of the devices in the VERIZON operator network 202 are assigned or governed by the network-specific credentials 302 (e.g., which have higher priority than the universal credentials 300 based on the lower level at which they are assigned in the hierarchical namespace). However, calls made to the US-EAST-NY-3 edge server 206 in the VERIZON operator network 202 are assigned or governed by the device-specific credentials 308. Similarly, calls made to most of the devices in the AT&T operator network 204 are assigned or governed by the universal credentials 300. However, calls made to the ANEDENVER edge server 212 in the AT&T operator network 204 are assigned or governed by the device-specific credentials 310.

Figure 4:
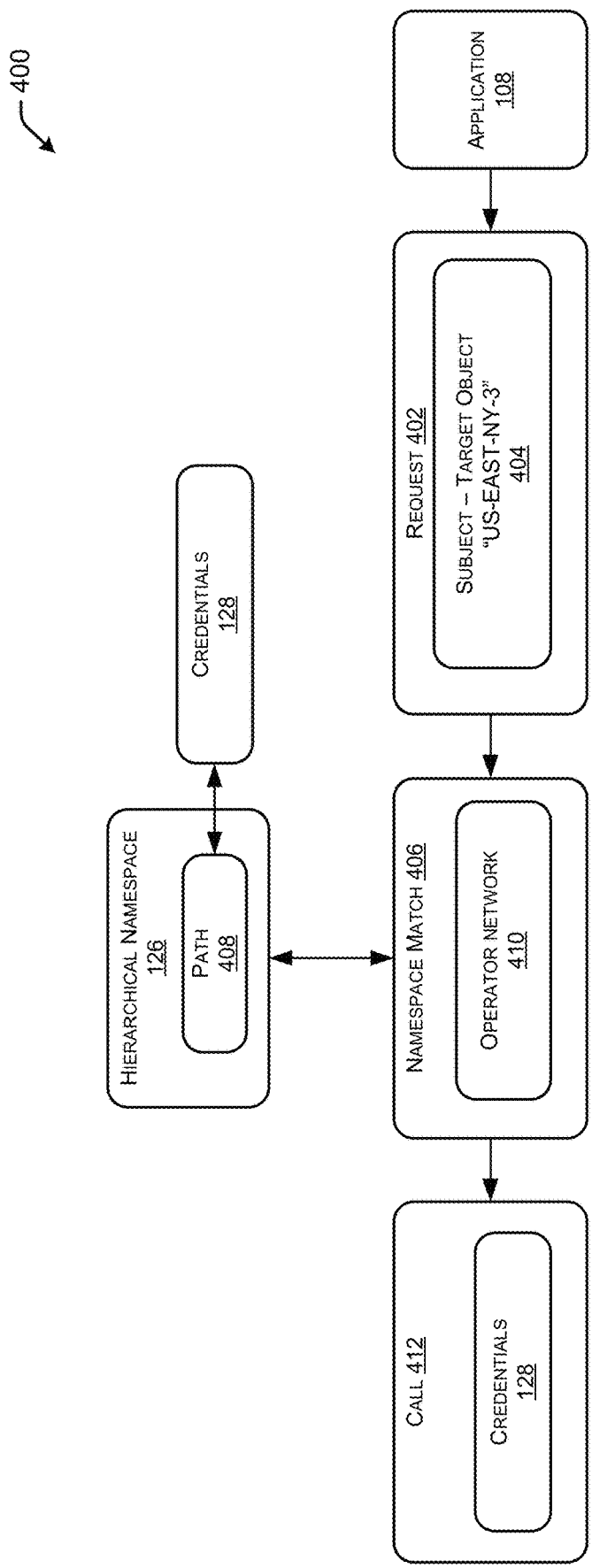
FIG. 4 is a diagram illustrating how the hierarchical namespace is accessed to determine which credentials to use to initiate a call from a network API gateway to an operator API server.

FIG. 4 is a diagram 400 illustrating how the hierarchical namespace is accessed to determine which credentials to use to initiate a call from a network API gateway to an operator API server. As shown, the application 108 issues a request 402 to the network API gateway. The request 402 includes a subject, or target object 404—the edge device identified by the IP address "US-EAST-NY-3". Consequently, the application 108 may issue the request to check in on one or multiple connections between the edge device "US-EAST-NY-3" and one or multiple endpoint devices served by the aforementioned connection(s).

For instance, to ensure users of the application 108 are having an optimal or sufficient experience (e.g., gaming experience, videoconferencing experience), the application 108 may want to know properties related to the quality of a connection, such as latency (e.g., round trip time (RTT)), packet loss rates, jitter, etc. Accordingly, the application 108 issues the request 402 in a common format (e.g., "api.get-properties") that is translated into a call made in a lower-level protocol so the state information capturing the properties can be retrieved from the edge device "US-EAST-NY-3" and returned to the application.

Next, the network API gateway receives the request and performs a namespace match 406 between the target object 404 and a path 408 in the hierarchical namespace 126. The network API gateway uses the path 408 (e.g., the prefix objects before the target object) to identify the operator network 410 to which the target object is connected and to which the call is to be sent. Moreover, the network API gateway uses the path 408 to retrieve credentials 128 (as previously assigned to the path by the application 108). In the example of FIG. 3A, these credentials 128 are the universal credentials 300. In the examples of FIGS. 3B and 3C, these credentials 128 are the network-specific credentials 302. In the example of FIG. 3D, these credentials 128 are the device-specific credentials 310.

The network API gateway can then initiate a call 412 to the operator API server associated with the identified operator network 410. The call 412 includes the credentials 128 useable for the operator API server to authenticate the call 412. In various examples, the credentials 128 include a token (e.g., {fE6UKv}).

Figure 5:
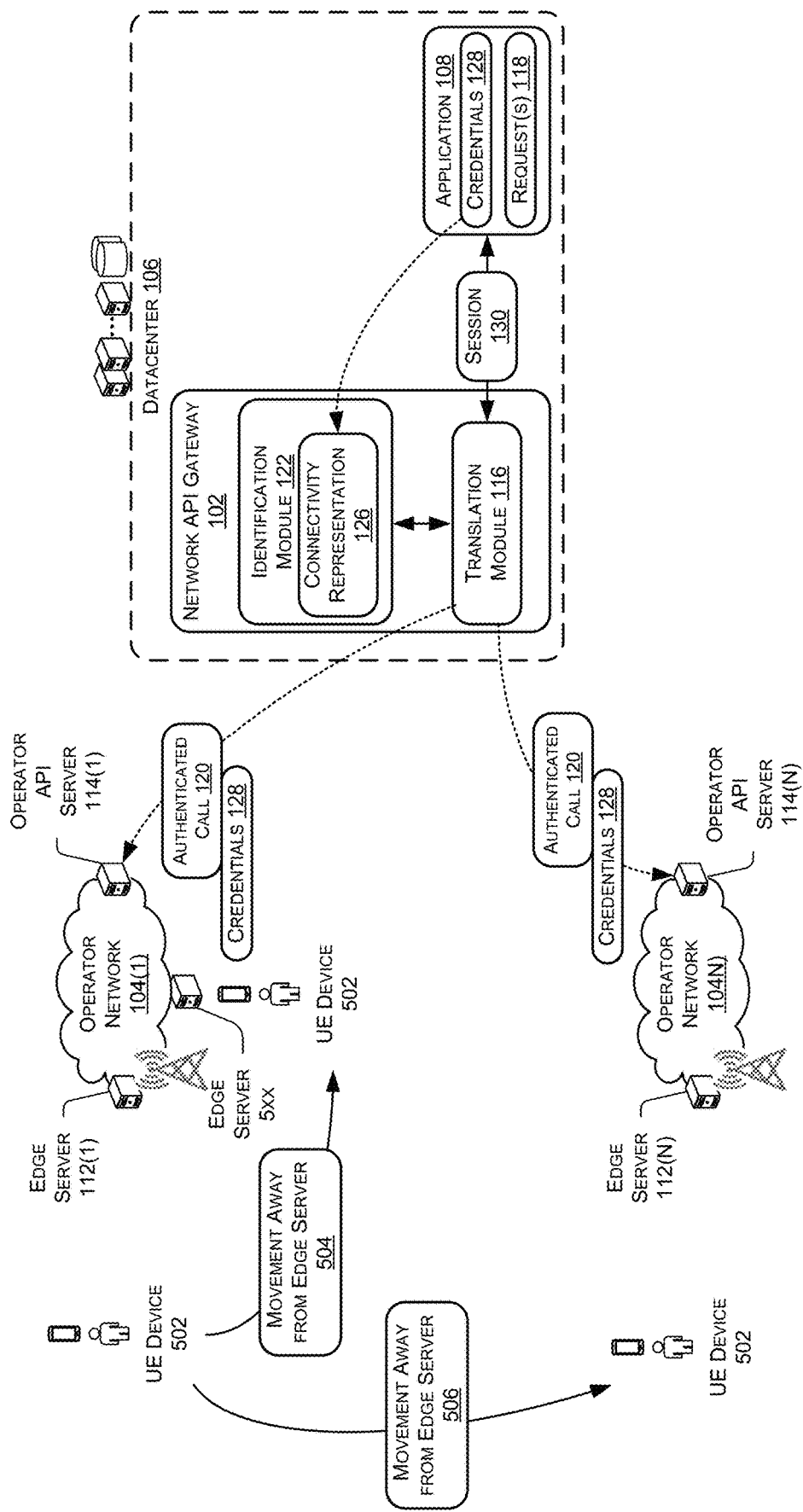
FIG. 5 illustrates aspects of the example environment of FIG. 1 where a user equipment (UE) device changes locations which affects the quality of a connection with an edge server.

FIG. 5 illustrates aspects of the example environment of FIG. 1 where a user equipment (UE) device 502 changes locations which affects the quality of a connection with an edge server. In one example, a user of the UE device 502 may be playing a video game while travelling in an automobile. A request to play the game is communicated to the application 108 executing in the datacenter 106 and, in response, the application identifies the edge server 112(1) as a resource closest to a location of the UE device 502, such that the use will be provided with an optimal or acceptable gaming experience (e.g., expected latency is below a threshold latency).

As described above, the edge server 112(1) is part of an operator network 104(1) and the application 108 is capable of placing the game code (e.g., before or after the request to play the game is received from the UE device 502) on the edge server 112(1). As the UE device 502 moves a sufficient distance away from the edge server 112(1) (e.g., the location of the UE device 502 changes), as captured by elements 504 and 506 in FIG. 5, the latency and/or other properties that capture the quality of the connection between the UE device 502 and the edge server 112(1) may increase (or decrease) to a level that is no longer acceptable (e.g., thresholds or key performance indicators may be established by the application 108).

Accordingly, the application 108 may issue a request 118 for edge server 112(1) to communicate information related to a quality of a connection between the UE device 502 and the edge server 112(1). If the connection quality is below a threshold, the application 108 may want to transfer the gaming session to a new edge server so the user has a better user experience (e.g., a connection with higher quality). The new edge server is likely located closer to the UE device 502 compared to the current edge server 112(1). In one example, a new edge server 508 may be connected to the same operator network 104(1) as the previous edge server 112(1). In another example, the application 108 may determine that a different operator network 104(N) can provide a new edge server 112(N) that provides a higher quality connection than the previous edge server 112(1).

To summarize, the application 108 may use requests 118 (e.g. in the control plane) to gather information related to a status and/or changes in device, connection, and/or network properties (e.g., related to the data plane) so that experiences provided to the endpoint devices are improved (e.g., latency is reduced). For example, the techniques described herein can use MEC architectures implemented at cellular base stations or other edge nodes to enable operators to host content closer to the edge of the network, delivering high-bandwidth, low-latency applications to end users. For example, a cloud provider's footprint may be co-located at a remote carrier site (e.g., a carrier datacenter), allowing for the edge infrastructure and applications to run closer to the end user via 5G networks.

An endpoint device can include a server computer, a desktop computer, a laptop computer, a tablet computer, a smartphone, a set-top box, a head-mounted display device, a smartwatch, an Internet-of-Things (IoT) device, and the like. A network device configured in an operator network or a datacenter typically includes a server, but can include other devices and components as well. For example, a network device may be utilized to interconnect servers in an operator network or a datacenter. A network device may comprise a switch, a router, etc. For the sake of simplicity, various aspects of the computing systems and other devices of the described examples are illustrated without showing certain conventional details.

Figure 6:
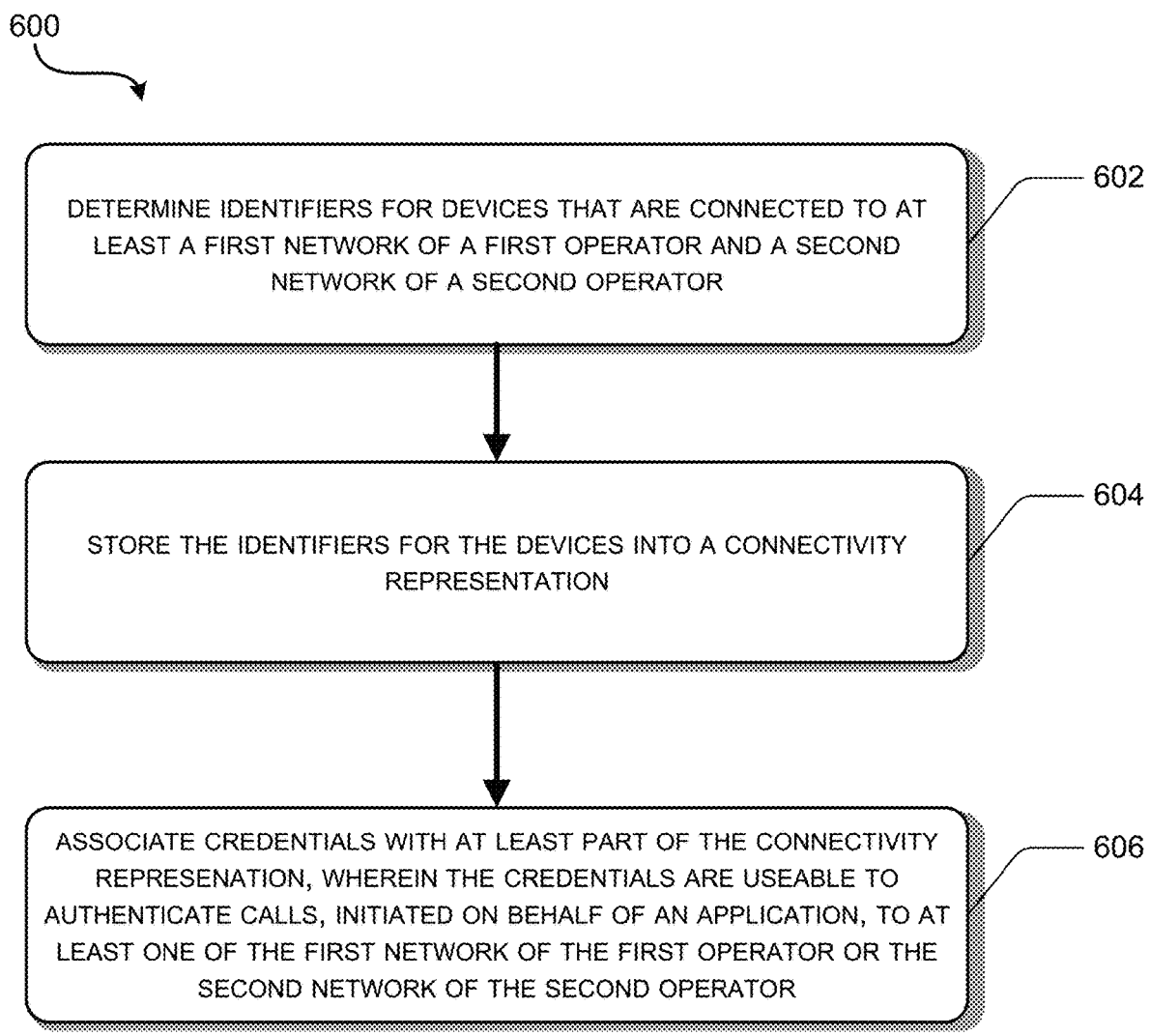
FIG. 6 is a flowchart depicting an example procedure for creating a connectivity representation and associating credentials with a part of the connectivity representation.
Figure 7:
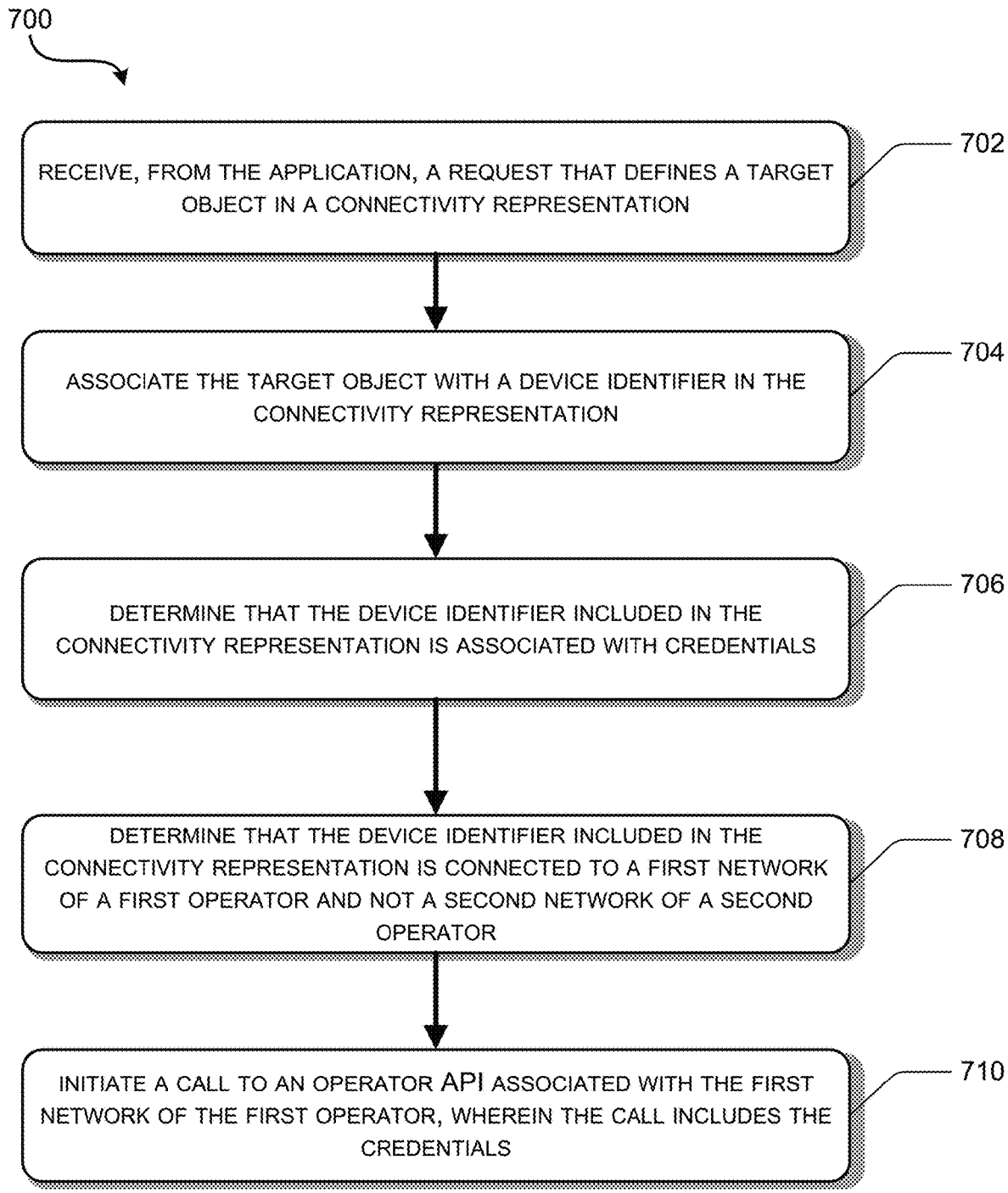
FIG. 7 is a flowchart depicting an example procedure for translating a request into a call to an operator network which can be authenticated using appropriate credentials.

Turning now to FIGS. 6 and 7, example operational procedures for implementing the examples described above are illustrated. The operational procedures can be implemented by the components illustrated in FIGS. 1-5.

It should be understood by those of ordinary skill in the art that the operations disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated operational procedures can end at any time and need not be performed in their entireties. Some or all operations of the operations can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. The implementation is a matter of choice dependent on the performance and other requirements of the computing system. Accordingly, the logical operations may be implemented in software, in firmware, in special purpose digital logic, and any combination thereof.

FIG. 6 is a flowchart 600 depicting an example procedure for creating a connectivity representation and associating credentials with a part of the hierarchical namespace.

At operation 602, identifiers for devices that are connected to at least a first network of a first operator and a second network of a second operator are determined. For example, the network API gateway determines the landscape of all the devices on different operator networks which it may want to interact.

At operation 604, the identifiers for the devices are stored (e.g., mapped) in a connectivity representation 126. As described, above, a path or an entry in the connectivity representation defines at least an object that identifies one of the first network of the first operator or the second network of the second operator and an object that includes a device identifier.

At operation 606, credentials are associated with at least part of the connectivity representation. The credentials are useable to authenticate calls, initiated on behalf of an application, to at least one of the first network of the first operator or the second network of the second operator.

FIG. 7 is a flowchart 700 depicting an example procedure for translating a request into a call to an operator network which can be authenticated using appropriate credentials.

At operation 702, a request that defines a target object in a connectivity representation is received from an application.

At operation 704, the target object is associated with a device identifier in the connectivity representation (e.g., matched with a corresponding path in the hierarchical namespace).

At operation 706, it is determined that the device identifier included in the connectivity representation is associated with preassigned credentials.

At operation 708, it is determined that the device identifier included in the connectivity representation is connected to the first network of the first operator (e.g., and not a second network of a second operator).

At operation 710, a call to an operator API associated with the first network of the first operator is initiated, the call including the credentials.

Figure 8:
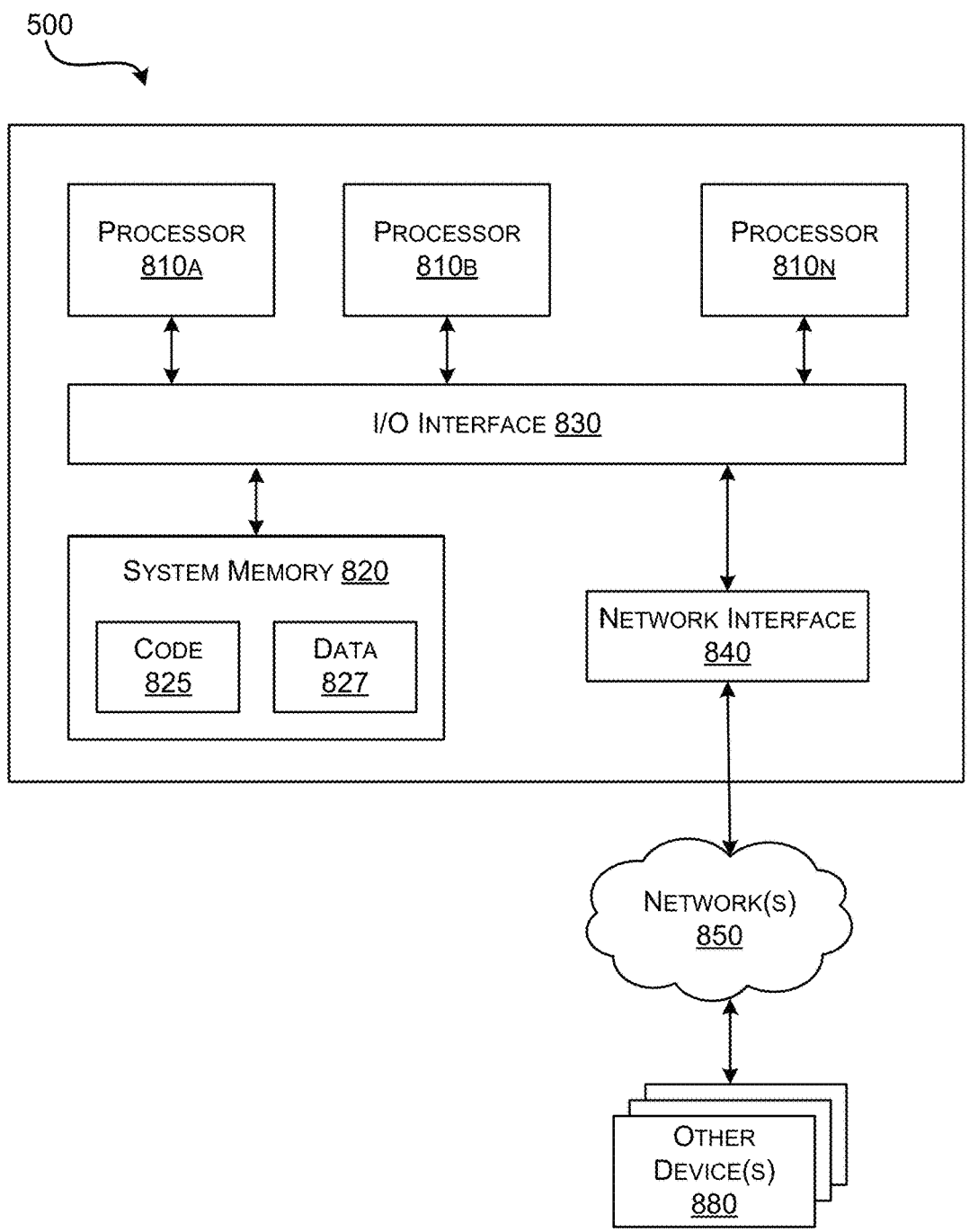
FIG. 8 is an example computing system in accordance with the present disclosure.

FIG. 8 illustrates a general-purpose computing device 800. In the illustrated embodiment, computing device 800 includes one or more processors 810a, 810b, and/or 810n (which may be referred herein singularly as "a processor 810" or in the plural as "the processors 810") coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x88, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 820 as code 825 and data 827.

In one embodiment, I/O interface 830 may be configured to coordinate I/O traffic between the processor 810, system memory 820, and any peripheral devices in the device, including network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of I/O interface 830, such as an interface to system memory 820, may be incorporated directly into processor 810.

Network interface 840 may be configured to allow data to be exchanged between computing device 800 and other device or devices 880 attached to a network or network(s) 880, such as other computer systems or devices as illustrated in FIGS. 1 through 5, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

The disclosure presented herein also encompasses the subject matter set forth in the following clauses.

Example Clause A, a method implemented by a network application programming interface (API) gateway, comprising: determining identifiers for devices that are connected to at least a first network of a first operator and a second network of a second operator; mapping the identifiers for the devices into a hierarchical namespace, wherein a path in the hierarchical namespace defines at least: an object that identifies one of the first network of the first operator or the second network of the second operator; and an object that includes an identifier; associating credentials with at least part of the hierarchical namespace, wherein the credentials are useable to authenticate calls, initiated on behalf of an application, to at least one of the first network of the first operator or the second network of the second operator; receiving, from the application, a request that defines a target object in the hierarchical namespace; matching the target object with a corresponding path in the hierarchical namespace; determining that the corresponding path is included in the part of the hierarchical namespace associated with the credentials; determining, using the corresponding path, that the target object is connected to the first network of the first operator; and in response to determining that the corresponding path is included in the part of the hierarchical namespace associated with the credentials and that the target object is connected to the first network of the first operator, initiating a call to an operator API associated with the first network of the first operator, wherein the call includes the credentials.

Example Clause B, the method of Example Clause A, wherein the credentials are universal credentials associated with both the first network of the first operator and the second network of the second operator in the hierarchical namespace.

Example Clause C, the method of Example Clause A, wherein the credentials are network-specific credentials associated with the first network of the first operator.

Example Clause D, the method of Example Clause A, wherein the credentials are device-specific credentials associated with the target object.

Example Clause E, the method of any one of Example Clauses A through D, wherein the credentials are generated by the application.

Example Clause F, the method of any one of Example Clauses A through E, wherein the devices comprise mobile edge computing (MEC) devices and endpoint devices.

Example Clause G, the method of Example Clause F, wherein the call is intended to retrieve properties associated with a quality of a connection between a MEC device and an endpoint device.

Example Clause H, a system comprising: one or more processors; and computer storage media storing instructions that, when executed by the one or more processors, cause the system to: determine identifiers for devices that are connected to at least a first network of a first operator and a second network of a second operator; store the identifiers for the devices in a connectivity representation, wherein the identifiers for the devices are associated with an object that identifies one of the first network of the first operator or the second network of the second operator; and associate credentials with at least part of the connectivity representation, wherein the credentials are useable to authenticate calls, initiated on behalf of an application, to at least one of the first network of the first operator or the second network of the second operator.

Example Clause I, the system of Example Clause H, wherein the credentials are universal credentials associated with both the first network of the first operator and the second network of the second operator in the connectivity representation.

Example Clause J, the system of Example Clause H, wherein the credentials are network-specific credentials associated with the first network of the first operator in the connectivity representation.

Example Clause K, the system of Example Clause H, wherein the credentials are device-specific credentials associated with a target object included in a request from an application in the connectivity representation.

Example Clause L, the system of any one of Example Clauses H through K, wherein the credentials are generated by the application.

Example Clause M, the system of any one of Example Clauses H through L, wherein the devices comprise mobile edge computing (MEC) devices and endpoint devices.

Example Clause N, a system comprising: one or more processors; and computer storage media storing instructions that, when executed by the one or more processors, cause the system to: receive, from an application, a request 118 that defines a target object 404 in a connectivity representation; associate the target object with a device identifier in the connectivity representation; determine that the device identifier in the connectivity representation is associated with preassigned credentials and an operator network; and initiate a call to an operator application programming interface (API) associated with the operator network, wherein the call includes the preassigned credentials.

Example Clause O, the system of Example Clause N, wherein the preassigned credentials are universal credentials useable for both the operator network and another operator network.

Example Clause P, the system of Example Clause N, wherein the preassigned credentials are network-specific credentials useable for the operator network and not another operator network.

Example Clause Q, the system of Example Clause N, wherein the credentials are device-specific credentials associated with the target object included in the operator network.

Example Clause R, the system of any one of Example Clauses N through Q, wherein the credentials are generated by the application.

Example Clause S, the system of any one of Example Clauses N through R, wherein the connectivity representation comprises a hierarchical namespace that includes identifiers for devices connected to the operator network, the devices comprise mobile edge computing (MEC) devices and endpoint devices.

Example Clause T, the system of Example Clause S, wherein the call is intended to retrieve properties associated with a quality of a connection between a MEC device and an endpoint device.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method implemented by a network application programming interface (API) gateway in a cloud configured to communicate with at least a first network and a second network, comprising:
   determining identifiers for devices that are connected to the first network and the second network, wherein:
      the first network is operated by a first operator;
      the second network is operated by a second operator that is different than the first operator; and
      the first operator and the second operator are different than a third operator that operates the cloud;
   mapping the identifiers for the devices into a hierarchical namespace, wherein a path in the hierarchical namespace defines at least:
      an object that identifies one of the first network operated by the first operator or the second network operated by the second operator; and
      an object that includes an identifier;
   associating credentials with at least part of the hierarchical namespace, wherein the credentials are useable to authenticate calls, initiated on behalf of an application hosted in the cloud, to at least one of the first network operated by the first operator or the second network operated by the second operator;
   receiving, from the application, a request that defines a target object in the hierarchical namespace;
   matching the target object with a corresponding path in the hierarchical namespace;
   determining that the corresponding path is included in the part of the hierarchical namespace associated with the credentials;
   determining, using the corresponding path, that the target object is connected to the first network operated by the first operator; and
   in response to determining that the corresponding path is included in the part of the hierarchical namespace associated with the credentials and that the target object is connected to the first network operated by the first operator, initiating a call to an operator API associated with the first network operated by the first operator, wherein the call includes the credentials.

2. The method of claim 1, wherein the credentials are universal credentials associated with both the first network operated by the first operator and the second network operated by the second operator in the hierarchical namespace.

3. The method of claim 1, wherein the credentials are network-specific credentials associated with the first network operated by the first operator.

4. The method of claim 1, wherein the credentials are device-specific credentials associated with the target object.

5. The method of claim 1, wherein the credentials are generated by the application.

6. The method of claim 1, wherein the devices comprise mobile edge computing (MEC) devices and endpoint devices.

7. The method of claim 6, wherein the call is intended to retrieve properties associated with a quality of a connection between a MEC device and an endpoint device.

8. A system for implementing a network application programming interface (API) gateway in a cloud configured to communicate with at least a first network and a second network, comprising:
   one or more processors; and
   computer storage media storing instructions that, when executed by the one or more processors, cause the system to:
      determine identifiers for devices that are connected to the first network and the second network, wherein:
         the first network is operated by a first operator;
         the second network is operated by a second operator that is different than the first operator; and
         the first operator and the second operator are different than a third operator that operates the cloud;
      store the identifiers for the devices in a hierarchical namespace, wherein the identifiers for the devices are associated with a first path in the hierarchical namespace that includes a first object identifying the first network operated by the first operator or a second path in the hierarchical namespace that includes a second object identifying the second network operated by the second operator;
      associate credentials with at least part of the hierarchical namespace, wherein the credentials are useable to authenticate calls, initiated on behalf of an application hosted in the cloud, to the first network operated by the first operator;
      match a target object defined in a request with the first path in the hierarchical namespace;
      determine that the first path is included in the part of the hierarchical namespace associated with the credentials; and
      initiate a call to an operator API associated with the first network operated by the first operator, wherein the call includes the credentials.

9. The system of claim 8, wherein the credentials are universal credentials associated with both the first network operated by the first operator and the second network operated by the second operator in the hierarchical namespace.

10. The system of claim 8, wherein the credentials are network-specific credentials associated with the first network operated by the first operator in the hierarchical namespace.

11. The system of claim 8, wherein the credentials are device-specific credentials associated with the target object defined in the request.

12. The system of claim 8, wherein the credentials are generated by the application.

13. The system of claim 8, wherein the devices comprise mobile edge computing (MEC) devices and endpoint devices.

14. A system for implementing a network application programming interface (API) gateway in a cloud configured to communicate with an operator network operated by a first operator, comprising:
   one or more processors; and computer storage media storing instructions that, when executed by the one or more processors, cause the system to:

receive, from an application hosted in the cloud, a request that defines a target object in a hierarchical namespace;

match the target object defined in the request with a device identifier that is included in a path of the hierarchical namespace that also includes an object identifying the operator network operated by the first operator, wherein the first operator is different than a second operator that operates the cloud;

determine that the device identifier is associated with credentials that have been previously assigned to the path of the hierarchical namespace that includes the device identifier and the object identifying the operator network operated by the first operator; and initiate a call to an operator application programming interface (API) associated with the operator network, wherein the call includes the credentials.

15. The system of claim 14, wherein the credentials are universal credentials useable for both the operator network and another operator network operated by a third operator.

16. The system of claim 14, wherein the credentials are network-specific credentials useable for the operator network and not another operator network operated by a third operator.

17. The system of claim 14, wherein the credentials are device-specific credentials associated with the target object included in the operator network.

18. The system of claim 14, wherein the credentials are generated by the application.

19. The system of claim 14, wherein the hierarchical namespace includes identifiers for devices connected to the operator network, the devices comprise mobile edge computing (MEC) devices and endpoint devices.

20. The system of claim 19, wherein the call is intended to retrieve properties associated with a quality of a connection between a MEC device and an endpoint device.

* * * * *